United States Patent
Lu et al.

(10) Patent No.: US 6,757,940 B2
(45) Date of Patent: Jul. 6, 2004

(54) HINGE FOR A NOTEBOOK COMPUTER

(75) Inventors: Sheng-Nan Lu, Shulin (TW); Ching-Hsiang Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 10/298,093

(22) Filed: Nov. 18, 2002

(65) Prior Publication Data

US 2004/0093690 A1 May 20, 2004

(51) Int. Cl.[7] .............................. E05D 11/10
(52) U.S. Cl. ..................... 16/330; 16/340; 16/303
(58) Field of Search .................. 16/330, 303, 342, 16/340; 361/680, 681, 682, 683; 248/917–923, 284.1; 403/146

(56) References Cited

U.S. PATENT DOCUMENTS

| | | | | |
|---|---|---|---|---|
| 5,398,378 A | * | 3/1995 | Lin ........................... | 16/303 |
| 5,704,094 A | * | 1/1998 | Hartigan et al. ........... | 16/303 |
| 5,799,371 A | * | 9/1998 | Lin ........................... | 16/330 |
| 5,970,819 A | * | 10/1999 | Katoh ....................... | 74/531 |
| 6,070,298 A | * | 6/2000 | Sorimachi ................. | 16/330 |
| 6,108,868 A | * | 8/2000 | Lin ........................... | 16/340 |
| 6,115,886 A | * | 9/2000 | Fujita ....................... | 16/330 |
| 6,305,050 B1 | * | 10/2001 | Imai ......................... | 16/303 |
| 6,481,057 B2 | * | 11/2002 | Lin ........................... | 16/340 |

FOREIGN PATENT DOCUMENTS

| | | | |
|---|---|---|---|
| JP | 11-6519 | * | 1/1999 |
| JP | 2001-355371 | * | 12/2001 |
| JP | 2002-139020 | * | 5/2002 |

* cited by examiner

*Primary Examiner*—Chuck Y. Mah
(74) *Attorney, Agent, or Firm*—Rosenberg, Klein & Lee

(57) ABSTRACT

A hinge for a notebook computer is composed of a first seat, a second seat and an axle. The first seat is mounted on a monitor, and the second seat is mounted on a body. The axle is securely mounted on the first seat and pivotally mounted on the second seat. Two sleeves are provided outside the axle and engaged with each other in a closed status. The first sleeve has two lugs received in a channel defined in the second sleeve. The second sleeve has two protrusive portions respectively formed at two sides of the channel, and two cambered surfaces formed between the channel and the protrusive portion. When a user lowers the monitor to a position that the lugs enter into the cambered surfaces, the monitor can automatically descend under the effect of gravity and the force of a resilient member.

9 Claims, 6 Drawing Sheets

HINGE FOR A NOTEBOOK COMPUTER

BACKGROUND OF THE INVENTION

1. Field of the Invention

The present invention is related to a hinge for notebook computer, and more particularly to a hinge which can automatically turn a monitor towards a body to close the notebook computer when a user pivots the monitor to a proper position.

2. Description of Related Art

A notebook computer is composed of a monitor pivotally mounted on a body by hinges. By using conventional hinges, the user must continuously turn the monitor down until the monitor abuts the body, and the computer needs a locking member to fasten the monitor and the body to prevent the monitor from freely pivoting. However, if using a hinge which can automatically lower the monitor to close the notebook computer, the monitor will strike the body, which may damage the notebook computer.

Therefore, the invention provides a hinge to mitigate and/or obviate the aforementioned problems.

SUMMARY OF THE INVENTION

The main objective of the invention is to provide a hinge for a notebook computer which can automatically lower the monitor but not strike the body.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
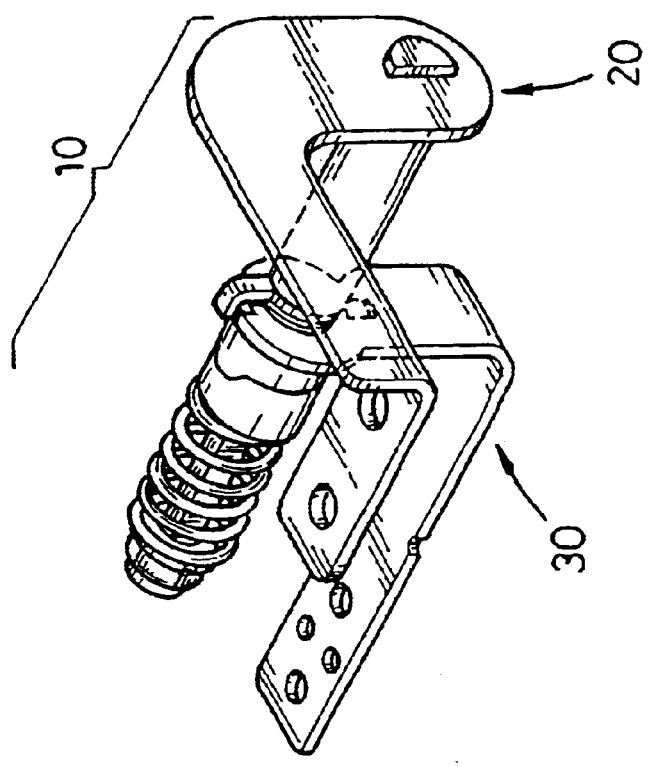
FIG. 1 is a perspective view of a hinge for a notebook computer in accordance with the invention.
Figure 2:
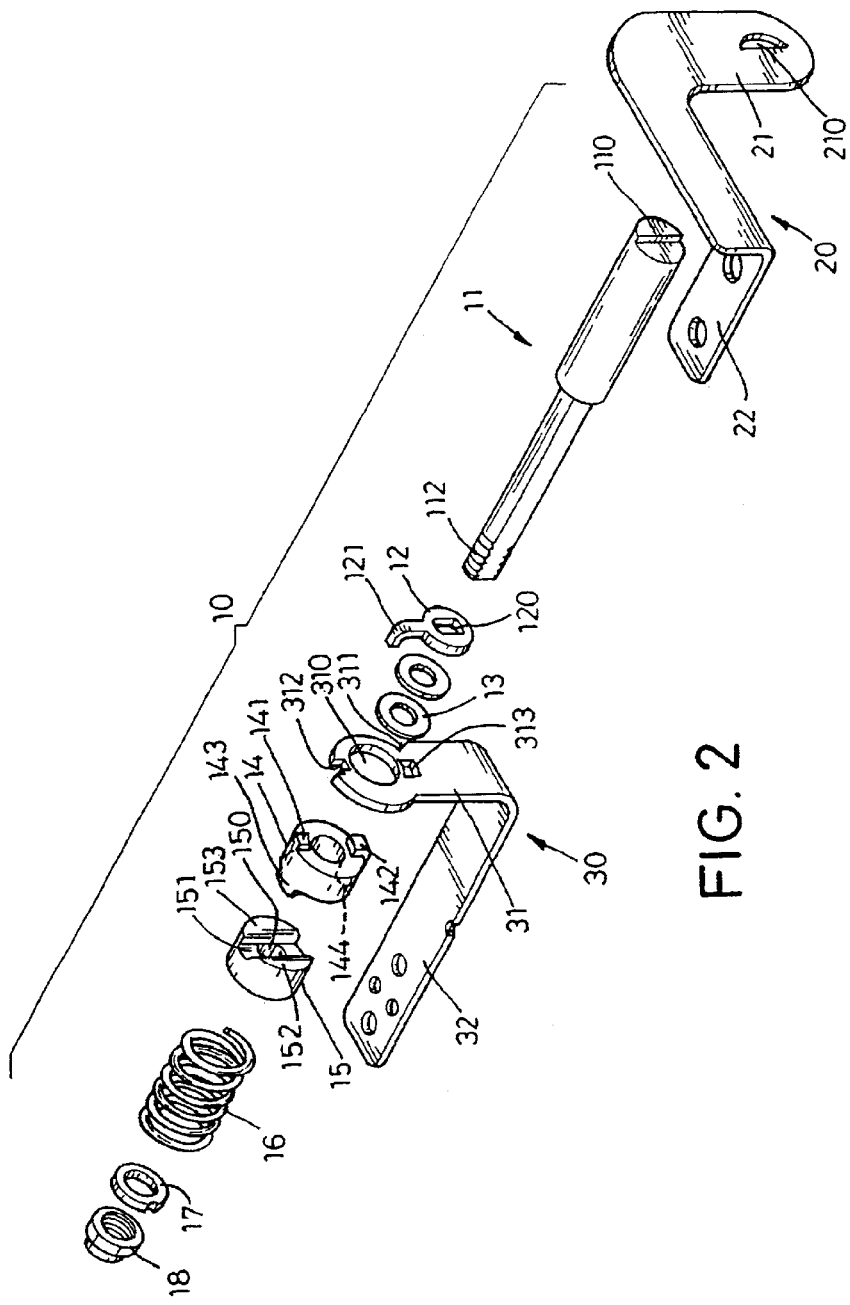
FIG. 2 is an exploded perspective view of the hinge in FIG. 1.

Referring to FIGS. 1 and 2, a hinge for a notebook computer in accordance with the present invention is composed of an axle (10), a first seat (20) and a second seat (30), wherein the first seat (20) is installed on a monitor (not shown or numbered) of the computer, the second seat (30) is installed on a body (not shown or numbered) of the computer, and they are pivotally connected together by the axle (10).

The axle (10) has a shaft (11) with a large part (110) and a small part (112). The axle (10) further has a semi-circular protrusion (not numbered) formed at a first end adjacent the large part (110), and a thread (not numbered) formed at a second end adjacent the small part (112). Two flat surfaces (not numbered) are formed on opposite sides of the small part (112).

The first seat (20) is composed of a first upright portion (21) and a first lateral portion (22). The first upright portion (21) with an L-shape has a semi-circular hole (210) defined therethrough, and the semi-circular protrusion of the large part (110) is inserted in the hole (210) to mount the axle (10) on the first seat (20). Thus, the first seat (20) can be rotated along with the axle (10). Those skilled in the art should know that the cross section of the protrusion and the hole (210) is not limited in this shape and can be other non-circular shapes, such as crescent, polygon etc.

The first lateral portion (22) is substantially perpendicular to the first upright portion (21) and secured on the monitor of the computer by fasteners (not shown or numbered).

The second seat (30) with an L-shape is composed of a second upright portion (31) and a second lateral portion (32). A circular opening (310) is defined through the second upright portion (31). An aperture (313) is defined beneath the opening (310), and a notch (312) is defined above the opening (310). An arcuate notch (311) is coaxially defined along an outer circumference of the circular opening (310) from the notch (312), wherein the length of the arcuate notch (311) is substantially one third the entire circumference.

The small part (112) of the axle (10) extends through the opening (310) and is engaged with a nut (18) at the second end of the axle (10). A positioning disk (12) is provided outside the small part (112) of the axle (10), and between the large part (110) and the second upright portion (31). A first hole (120) matching a cross section of the small part (112) is defined through the positioning disk (12) to disable the axle (10) to rotate about the positioning disk (12). A finger (121) is formed at an outer periphery of the positioning disk (12), and is located in the notch (312) of the second upright portion (31) in a status that the computer is closed and the monitor abuts the body. Two washers (13) are provided between the positioning disk (12) and the second upright portion (31).

A first sleeve (14), a second sleeve (15), a resilient member (16), and a gasket (17) are in turn provided outside the small part (112) between the second upright portion (31) and the nut (18). The first sleeve (14) has a first lug (141) and a second lug (142) formed at a first side facing the second upright portion (31) and respectively received in the notch (312) and the aperture (313), and a third lug (143) and a fourth lug (144) formed at a second side opposite to the second upright portion (31).

The second sleeve (15) has a second hole (150) matching the cross section of the small part (112) defined therethrough, a channel (151) diametrically defined at a surface facing the first sleeve (14), and two protrusive portions (152, 153) respectively formed at two sides of the channel (151). Two cambered surfaces (not numbered) are respectively formed between the protrusive portions (152, 153) and the channel (151). The third and fourth lugs (143, 144) are engaged in the channel (151) in the status that the computer is closed.

Figure 3:
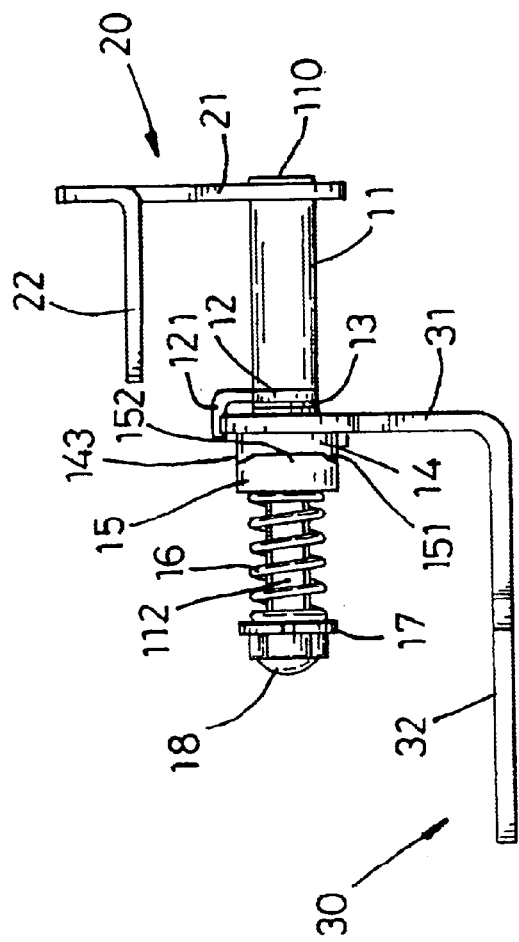
FIG. 3 is a front view of the hinge in FIG. 1.

Referring to FIG. 3, when the computer is closed and the monitor abuts the body, the finger (121) of the positioning disk (12) is located in the notch (312) of the second upright portion (31), and the first sleeve (14) is engaged with the second sleeve (15) to prevent the monitor from freely pivoting about the body.

Figure 4:
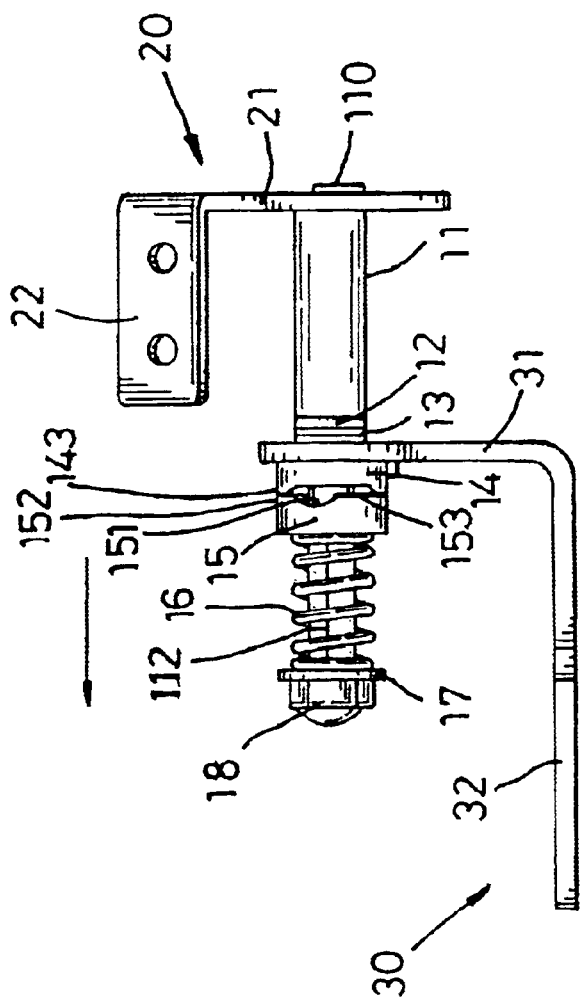
FIG. 4 is another front view of the hinge in an open status of a monitor.
Figure 5:
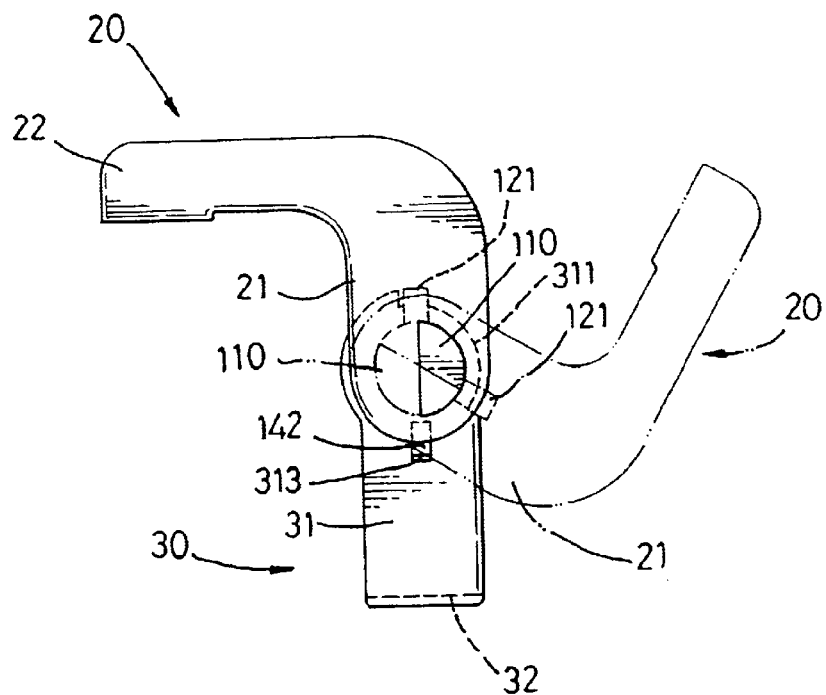
FIG. 5 is an operationally schematic view showing the hinge from a closed status to the open status.

Referring to FIGS. 4–5, when a user raises the monitor, the first seat (20) along with the axle (10) is pivoted upwards about the second seat (30). The second sleeve (15) is rotated about the first sleeve (14), and the third and fourth lugs (143, 144) are respectively moved along the cambered surfaces of the second sleeve (15) to push the second sleeve (15) toward the nut (18), and tightly abut the protrusive portions (152, 153) under the force of the resilient member (16). Therefore, the monitor can be positioned at any angle the user desired, and can be rotated in a maximum angular extent limited by the length of the arcuate notch (311).

When the user turns the monitor towards the body to close the computer, the first seat (20) along with the axle (10) is pivoted downwards about the second seat (30).

The third and fourth lugs (143, 144) are respectively moved on the protrusive portions (152, 153) and towards the cambered surfaces of the second sleeve (15). Once entering into the cambered surfaces, under the force of the resilient member (16) and the gravity effect on the monitor, the third and fourth lugs (143, 144) can automatically move downwards along the cambered surfaces and be received in the channel (151) again even if without the external force from the user. By the finger (121) blocked in the notch (312) and the lugs (143, 144) engaged in the channel (151), the monitor can be locked and will not freely pivot. Furthermore, when the finger (121) is blocked in the notch (312) and the lugs (143, 144), the first lateral portion (21) is parallel to the second lateral portion (31), which can prevent the monitor from striking the body.

Figure 6:
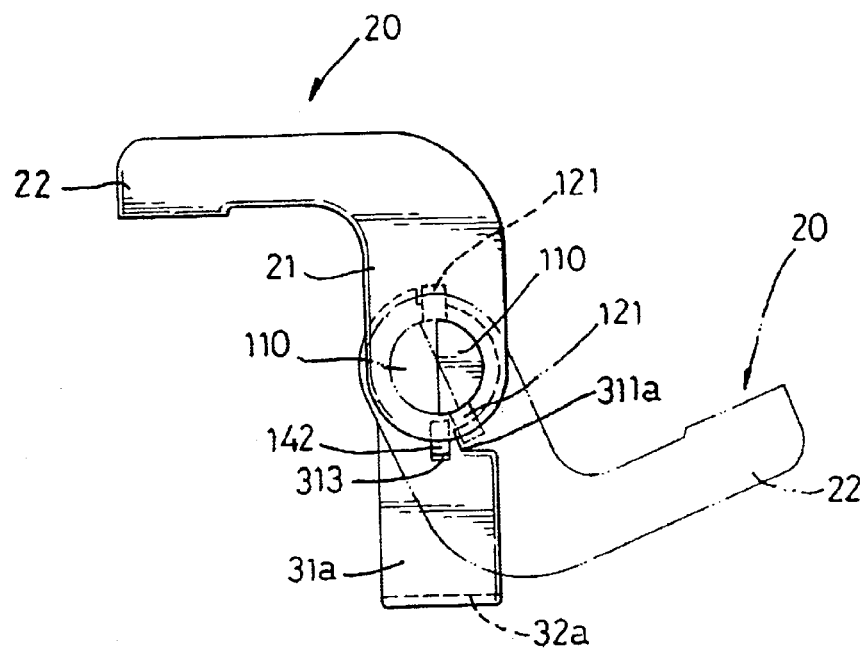
FIG. 6 is an operationally schematic view of a second embodiment of the hinge from the closed status to the open status.

FIG. 6 illustrates a second embodiment of the hinge in accordance with the invention. In this embodiment, the arcuate notch (311a) has a length of substantial half the entire circumference, and the monitor can be pivoted in an angular extent larger than that of the first embodiment.

Figure 7:
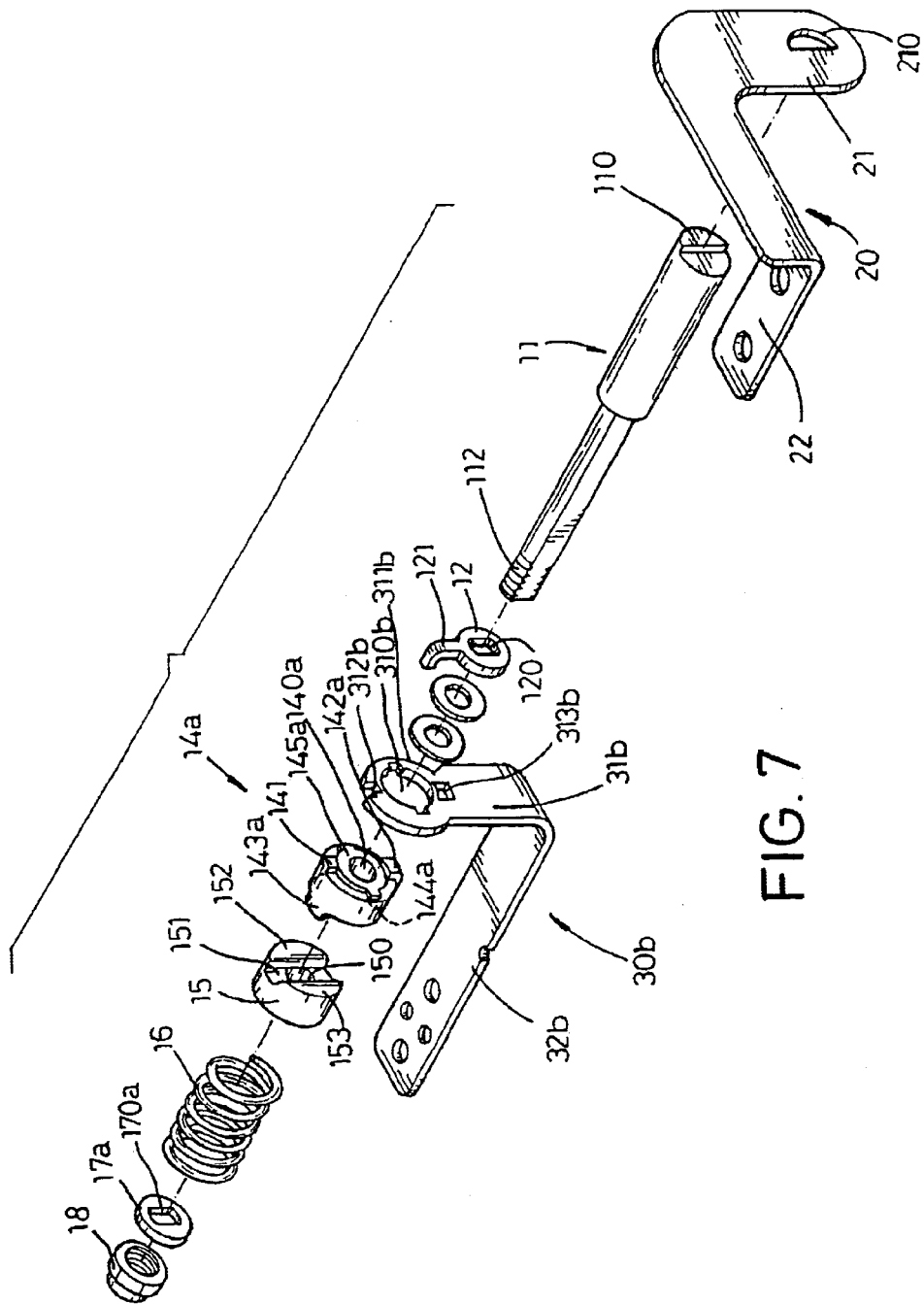
FIG. 7 is an exploded perspective view of a third embodiment of the hinge.

Referring to FIG. 7, in a third embodiment of the invention, the gasket (17a) has a third hole (170a) matching the cross section of the small part (112). The first sleeve (14a) has a flange (145a) formed at the first side facing the second upright portion (31b). Two fifth lugs (not numbered) are formed at opposite diametrical sides of the flange (145a). The circular opening (310b) of the second upright portion (31b) further has two cutouts (not numbered) defined at opposite diametrical sides thereof. The flange (145a) is received in the circular opening (310b), and the fifth lugs are respectively engaged in the cutouts of the circular opening (310b). Therefore, the first sleeve (14) can be mounted on the second upright portion (31b) more securely.

From the above description, it is noted that the invention has the following advantages:

1. By the first sleeve engaged with the second sleeve, the monitor can be locked and will not freely raise, so that a locking member can be eliminated from the notebook computer.
2. When the first sleeve is engaged with the second sleeve, the first lateral portion is parallel to the second lateral portion, and the monitor will not strike the body.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a notebook computer comprising:
    a first seat (20) having a first upright portion (21) and a first lateral portion (22) mounted on a monitor of the notebook computer;
    a second seat (30) formed with a second upright portion (31) and a second lateral portion (32) extending therefrom, wherein the second upright portion (31) has a circular opening (310) defined therethrough, an aperture (313) defined beneath the circular opening (310), a notch (312) defined above the circular opening (310), and an arcuate notch (311) defined peripherally thereon; the second lateral portion (32) being mounted on a body of the notebook computer; and
    an axle (10) having a shaft (11) formed with a large part (110) securely mounted on the first seat (20) and a small part (112) rotatably extending through the circular opening (310) of the second seat (30), a nut (18) engaged with the shaft (11) at an end of the small part (112), a positioning disk (12) provided between the large part (110) and the second upright portion (31), a finger (121) formed at an outer periphery of the positioning disk (12) and engaging a first portion of the notch (312) of the second upright portion (31) when the monitor abuts the body of the computer, two washers (13) provided between the positioning disk (12) and the second upright portion (13), a first sleeve (14) provided between the second upright portion (31) and the nut (18) and having a first lug (141) and a second lug (142) formed at a side facing the second upright portion (31) and engaging respectively a second portion of the notch (312) and the aperture (313), and a third lug (143) and a fourth lug (144) formed at a side opposite to the second upright portion (31), a second sleeve (15) provided between the first sleeve (14) and the nut (18) and having a channel (151) diametrically defined at a side facing the first sleeve (14) for receiving the third and fourth lugs (143, 144), two protrusive portions (152, 153) respectively formed at two sides of the channel (151), and two cambered surfaces respectively formed between the protrusive portions (152, 153) and the channel (151), a resilient member (16) provided between the second sleeve (15) and the nut (18), and a gasket (17) provided between the resilient member (16) and the nut (18).

2. The hinge as claimed in claim 1, wherein the shaft (11) has a non-circular protrusion formed at an end of the large part (110), and the first seat (20) has a non-circular hole (210) defined through the first upright portion (21) for receiving the non-circular protrusion.

3. The hinge as claimed in claim 2, wherein the non-circular protrusion of the shaft (11) and the non-circular hole (210) of the first seat (20) are semi-circular.

4. The hinge as claimed in claim 2, wherein the non-circular protrusion of the shaft (11) and the non-circular hole (210) of the first seat (20) are crescent.

5. The hinge as claimed in claim 2, wherein the non-circular protrusion of the shaft (11) and the non-circular hole (210) of the first seat (20) are polygonal.

6. The hinge as claimed in claim 1, wherein the first sleeve (14) has a flange (145a) formed at the side facing the second upright portion (31), and two fifth lugs formed at opposite diametrical sides of the flange (145a), the second upright portion (31) has two cutouts defined in the circular opening (310a), and the flange (145a) is received in the circular opening (310a) and the fifth lugs are respectively received in the cutouts.

7. The hinge as claimed in claim 1, wherein the small part (112) has two flat surfaces formed on opposite sides thereof, the positioning disk (12) having a first hole (120) for receiving the small part (112) therethrough.

8. The hinge as claimed in claim 7, wherein the second sleeve (15) has a second hole (150) matching the cross section of the small part (112).

9. The hinge as claimed in claim 7, wherein the gasket (17a) has a third hole (170a) matching the cross section of the small part (112).

* * * * *